"(12) United States Patent" (10) Patent No.: US 7,575,086 B2
Kamei et al. (45) Date of Patent: Aug. 18, 2009

(54) SENSOR MODULE FOR VEHICLE (75) Inventors: Takahiro Kamei, Saitama (JP);
Yoshimasa Eguchi, Saitama (JP);
Takahiro Ohmoto, Saitama (JP); Shigeo Tobaru, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 176 days.

(21) Appl. No.: 11/643,179

(22) Filed: Dec. 21, 2006

(65) Prior Publication Data

US 2007/0200692 A1 Aug. 30, 2007

(30) Foreign Application Priority Data

Feb. 24, 2006 (JP) ............... 2006-049106

(51) Int. Cl.
*B60K 28/10* (2006.01)
(52) U.S. Cl. .................. 180/274; 280/735; 340/436
(58) Field of Classification Search ........... 280/734, 280/735; 180/274; 293/4; 340/436, 660, 340/665
See application file for complete search history.

(56) References Cited

U.S. PATENT DOCUMENTS 5,907,213 A * 5/1999 Oshima et al. .............. 310/328
6,169,479 B1 1/2001 Boran et al.
6,681,631 B2 1/2004 Apel
7,127,948 B2 * 10/2006 Tavares et al. ........... 73/514.34
7,304,566 B2 12/2007 Mae et al.
2005/0077711 A1 * 4/2005 Yasui et al. ................ 280/735
2005/0104721 A1 * 5/2005 Mae et al. .................. 340/436
2005/0242596 A1 11/2005 Zanella et al.
2005/0274168 A1 12/2005 Stuetzler
2007/0043507 A1 * 2/2007 Tobaru ..................... 701/301
2008/0122599 A1 * 5/2008 Suzuki et al. .............. 340/436

FOREIGN PATENT DOCUMENTS

| DE | 100 31 793 C1 | 2/2002 |
| DE | 699 22 466 T2 | 4/2005 |
| DE | 10 2004 055 435 A1 | 6/2005 |
| JP | 2005-263038 | 9/2005 |
| JP | 2006194669 A * | 7/2006 |

* cited by examiner

*Primary Examiner*—Lesley D Morris
*Assistant Examiner*—Drew Brown
(74) *Attorney, Agent, or Firm*—Carrier, Blackman & Associates P.C.; William D. Blackman; Joseph P. Carrier (57) ABSTRACT

A sensor module mounted on a vehicle body includes a base plate, a sensor and a signal processing unit. The sensor includes a plurality of piezoelectric films for detecting an external force applied to the vehicle body. The signal processing unit is connected to the sensor for processing sensor signals output from the sensor. The sensor and the signal processing unit are attached to the base plate.

9 Claims, 8 Drawing Sheets

SENSOR MODULE FOR VEHICLE

FIELD OF THE INVENTION

The present invention relates to a vehicular sensor module designed to detect collision of a vehicle with an object.

BACKGROUND OF THE INVENTION

Vehicular sensor modules include sensors for detecting deformations of vehicle bodies and outputting information indicative of the detected deformations, and control units for determining, on the basis of the output information, whether the vehicle bodies collides with objects. The sensors of the sensor modules include optical fibers for detecting deformations of the vehicle bodies, as disclosed in JP-A-2005-263038.

Figure 9:
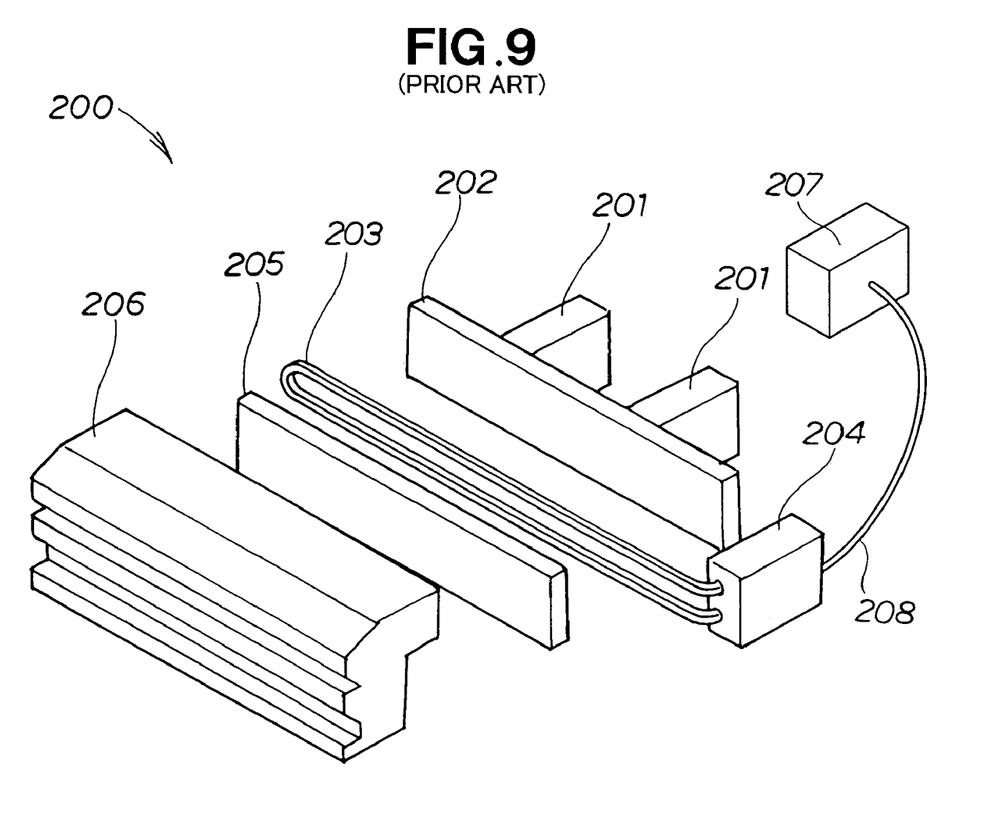
FIG. 9 is a schematic view of a conventional vehicular sensor module.

FIG. 9 hereof shows the sensor module disclosed in JP-A-2005-263038. The sensor module, designated generally at 200, includes an optical fiber 203 disposed on a front side of a bumper beam 202, a light-receiving/emitting unit 204 connected to an end of the optical fiber 203, and a signal processing unit 207 for processing a signal output from the light-receiving/emitting unit 204.

An amount of light passing through the optical fiber 203 varies depending upon an amount of deformation of the optical fiber 203 subjected to an external force. This relationship between the amount of light passing through the optical fiber 203 and the amount of deformation of the optical fiber 203 is used in a vehicular sensor of the sensor module 200.

The bumper beam 202 extends across front ends of front side frames 201, 201. The optical fiber 203 is covered by a bumper face 206 with a bumper 205 interposed therebetween. The light-receiving/emitting unit 204 includes a light-emitting section for emitting light into the optical fiber 203, and a light-receiving section for receiving light returning from the optical fiber 203.

The light-receiving/emitting unit 204 is spaced from the signal processing unit 207 while the unit 204 is directly connected to the optical fiber 203. The light-receiving/emitting unit 204 and the signal processing unit 207 should be separately installed to a vehicle body. This results in the increased number of steps for installing the sensor module 200 to the vehicle body. Further, for transmitting a signal from the unit 204 to the unit 207, a transmission line 208 needs to be interposed between the light-receiving/emitting unit 204 and the signal processing unit 207. Since the transmission line 208 is arranged within the vehicle body, the sensor module 200 has a complex arrangement.

There is a need for a vehicular sensor module of simple arrangement which can be easily assembled to the vehicle body structure.

SUMMARY OF THE INVENTION

According to the present invention, there is provided a sensor module for a vehicle, comprising: a base plate; a sensor attached to the base plate and including a plurality of piezoelectric films for detecting an external force applied to a vehicle body of the vehicle; and a signal processing unit attached to the base plate and connected to the sensor for processing sensor signals output from the sensor.

The sensor module has the simple arrangement in which the sensor and the signal processing unit are attached to the base plate. The sensor module of such a simple arrangement can be easily assembled to the vehicle body.

Preferably, the sensor is elongated with the plurality of piezo-electric films aligned longitudinally of the sensor, the base plate being elongated and greater in length than the sensor, the sensor and the signal processing unit being aligned longitudinally of the base plate.

Desirably, the base plate has a first sensor positioning region extending transversely of the vehicle body, and right and left second sensor positioning regions extending forwardly or rearwardly from opposite ends of the first sensor positioning region, the sensor extending from one of the right and left second sensor positioning regions over the first sensor positioning region to the other of the right and left second sensor positioning regions, the signal processing unit lying in the one of the right and left second sensor positioning regions.

Preferably, the sensor is flexible and further includes signal lines formed therein for transmitting the sensor signals to the signal processing unit, the sensor and the signal processing unit being attached to an attachment surface of the base plate, the signal processing unit having a connection end portion connected to the signal lines, the connection end portion of the signal processing unit being offset from the attachment surface of the base plate.

Since the sensor incorporates therein the signal lines, the sensor can be connected to the signal processing unit with lengths of the signal lines set to minimums.

Desirably, the base plate has attachment portions designed to be attached to the vehicle body.

Preferably, the vehicle body includes extension frames extending transversely of the vehicle body, the attachment portions being designed to be attached to the extension frames.

BRIEF DESCRIPTION OF THE DRAWINGS

A preferred embodiment of the present invention will hereinafter be described in detail, by way of example only, with reference to the accompanying drawings, in which.

DETAILED DESCRIPTION OF THE PREFERRED EMBODIMENT

Figure 1:
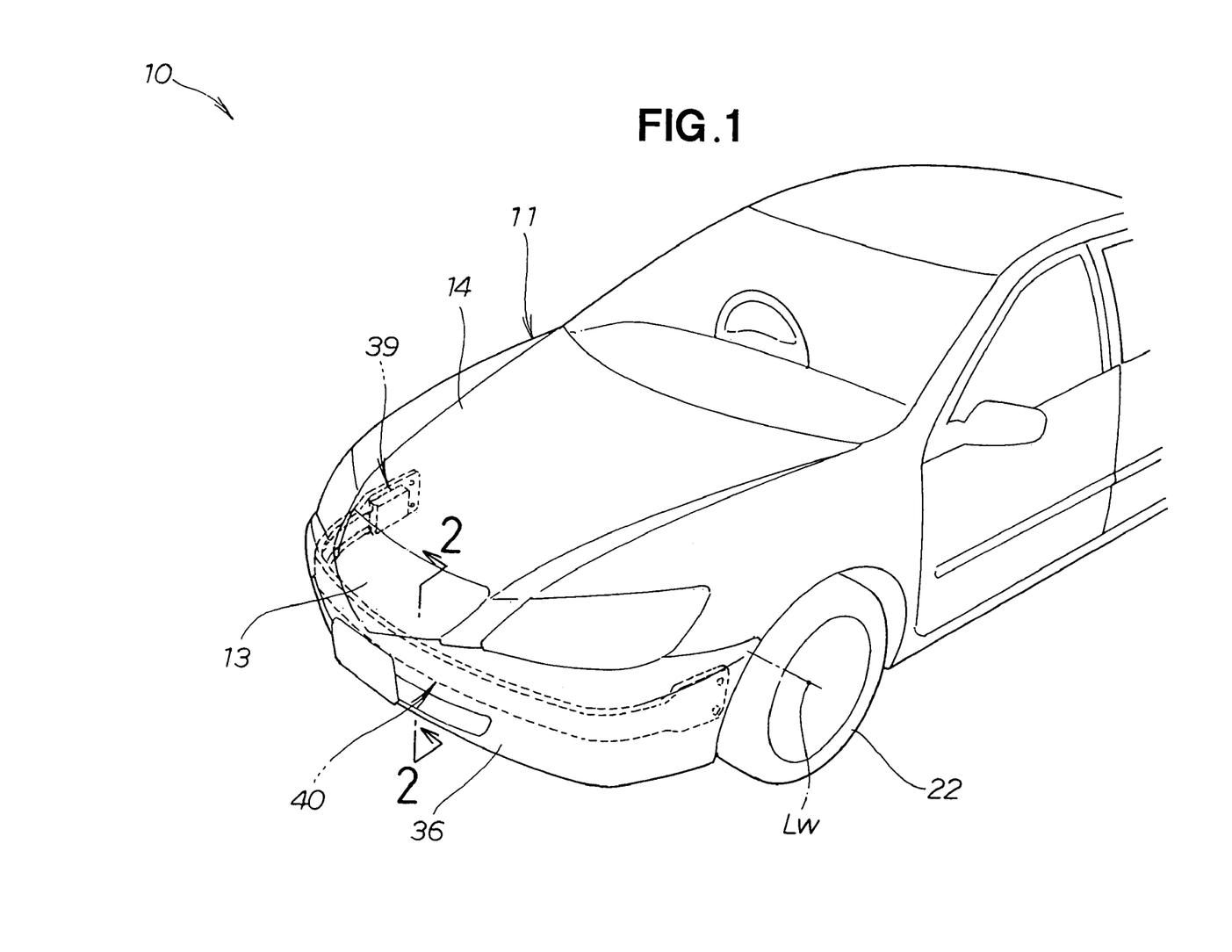
FIG. 1 is a perspective view of a vehicle including a sensor module according to the present invention.
Figure 2:
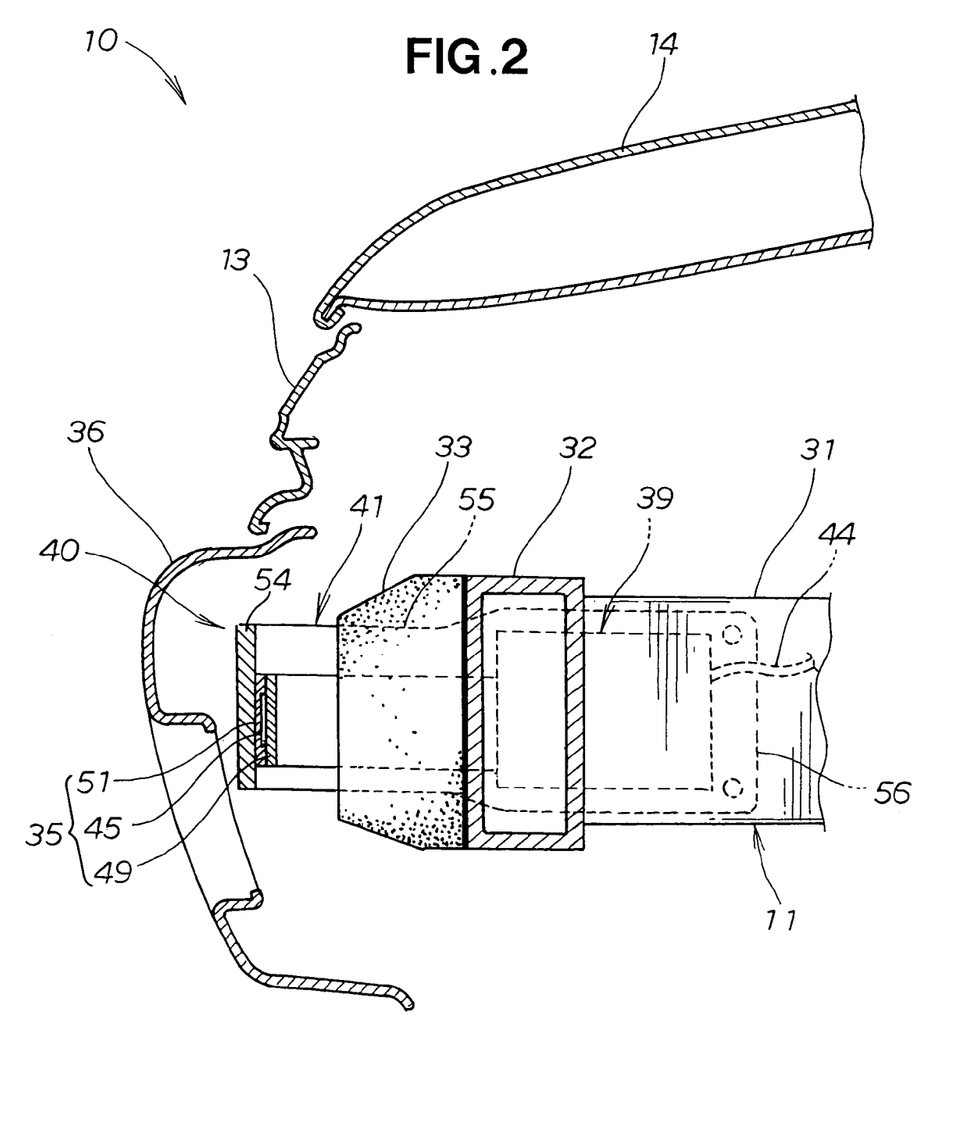
FIG. 2 is a cross-sectional view taken along line 2-2 of FIG. 1.
Figure 3:
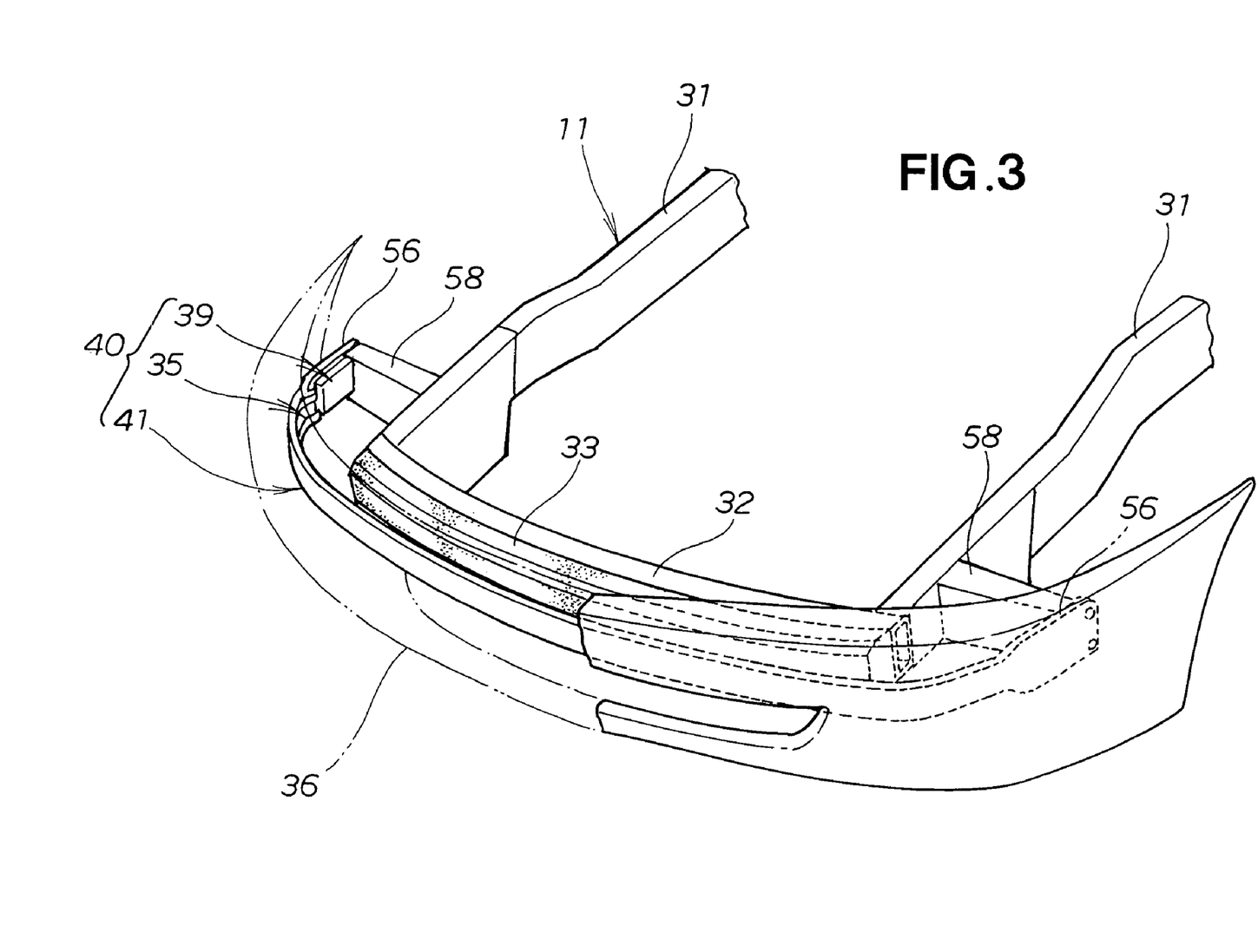
FIG. 3 is a view showing in perspective a vehicle body, a front bumper face and the sensor module shown in FIG. 1.

Referring to FIG. 1 to FIG. 3, a vehicle 10 includes a sensor module 40 attached to a vehicle body 11. The vehicle body 11 includes a front part having right and left front side frames 31, 31 extending longitudinally of the vehicle body 11, and a bumper beam 32 extending between front ends of the front side frames 31, 31. The bumper beam 32 carries a bumper 33 on a front surface thereof.

As shown in FIG. 2 to FIG. 5, the sensor module 40 includes a front portion spaced a given clearance forward from a front surface of the bumper 33. The bumper beam 32, the bumper 33 and the sensor module 40 are covered with a front bumper face 36. Above the front bumper face 36, there are disposed a front grill 13 and a bonnet 14. The front bumper face 36 is a deformable member made of, for example, resin material.

The sensor module 40 will be hereinbelow referred to as "module 40". The front bumper face 36 will be hereinbelow referred to as "bumper face 36".

The module 40 will be discussed hereinbelow. As shown in FIG. 2 to FIG. 5, the module 40 includes a sensor 35, a signal processing unit 39 and a base plate 41. The sensor 35 and the signal processing unit 39 are attached to the base plate 41.

The sensor 35 detects an external force applied to the vehicle body 11. For example, the sensor 35 outputs sensor signals upon detecting at least one of a vehicular acceleration generated when the external force is applied to the vehicle body 11, and an amount of a vehicular deformation corresponding to the vehicular acceleration.

The signal processing unit 39 is connected to the sensor 35 for processing the sensor signals output from the sensor 35. For example, the signal processing unit 39 outputs a control signal to various devices via a harness 44. The harness 44 may also serve as a power line for supplying an electric power from an electrical power source (not shown) to the signal processing unit 39.

The base plate 41 is in the form of, for example, a strip of resin or steel. The base plate 41 has its forward-facing surface. The base plate 41 has an arcuate shape as viewed in plan, and extends along the bumper face 36.

Figure 5:
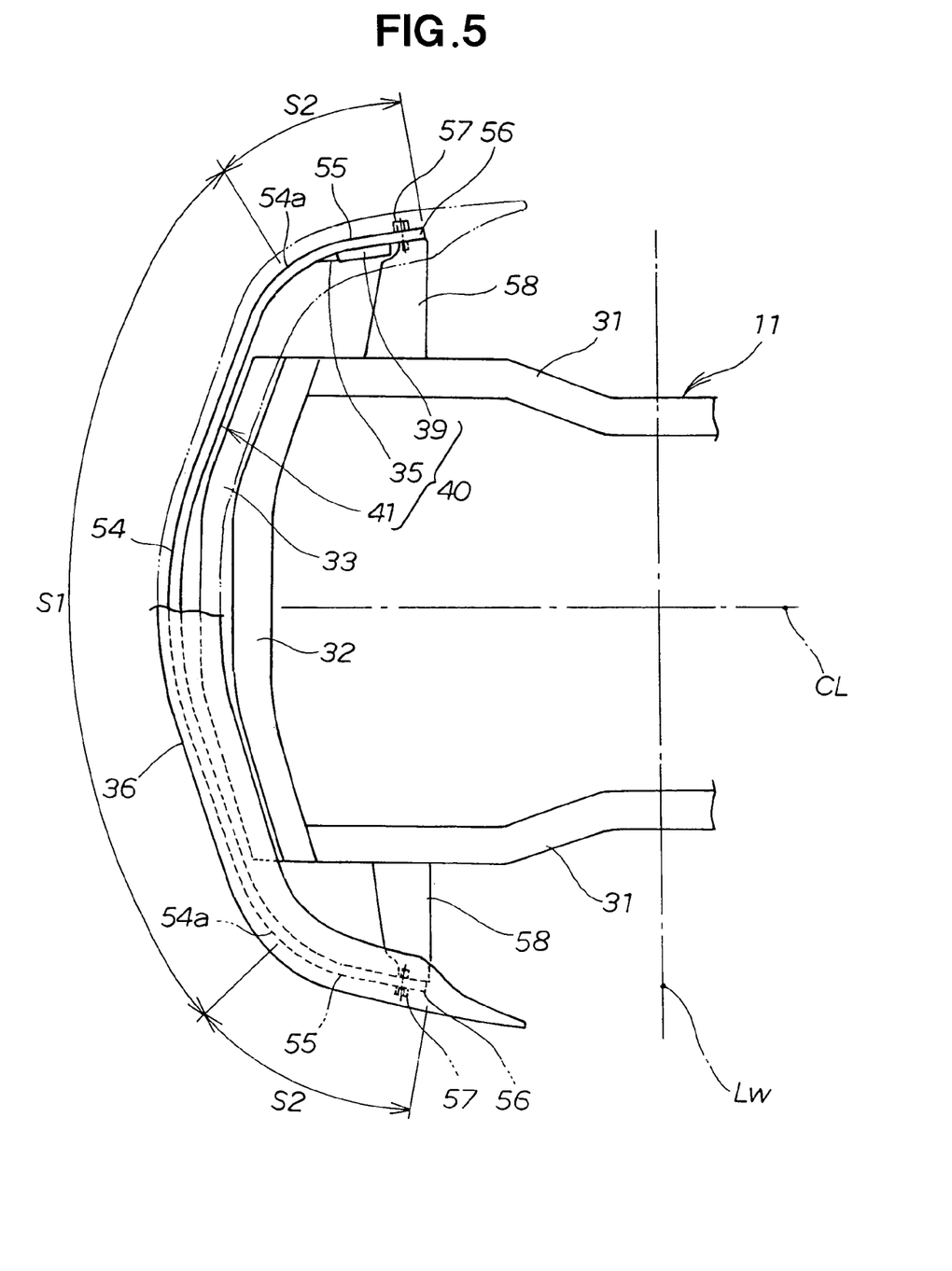
FIG. 5 is a view showing in plan the vehicle body, the front bumper face and the sensor module.

As shown in FIG. 5, the base plate 41 includes a first sensor positioning region 54 extending transversely of the vehicle body 11 (in a direction transverse to a vehicle body center line CL), and right and left second sensor positioning regions 55, 55 extending rearwardly from opposite ends 54a, 54a of the region 54. The first sensor positioning region 54 extends generally in parallel to a centerline Lw of a vehicle wheel 22 (FIG. 1). The first sensor positioning region 54 extends over a range S1. Each of the second sensor positioning regions 55, 55 extends over a range S2. A right one of the opposite ends 54a, 54a of the first sensor positioning region 54 is curved gently in the form of an arc, when viewed in plan, and contiguous with the right second sensor positioning region 55. A left one of the ends 54a, 54a is also curved gently in the form of an arc, when viewed in plan, and contiguous with the left second sensor positioning region 54.

Figure 4:
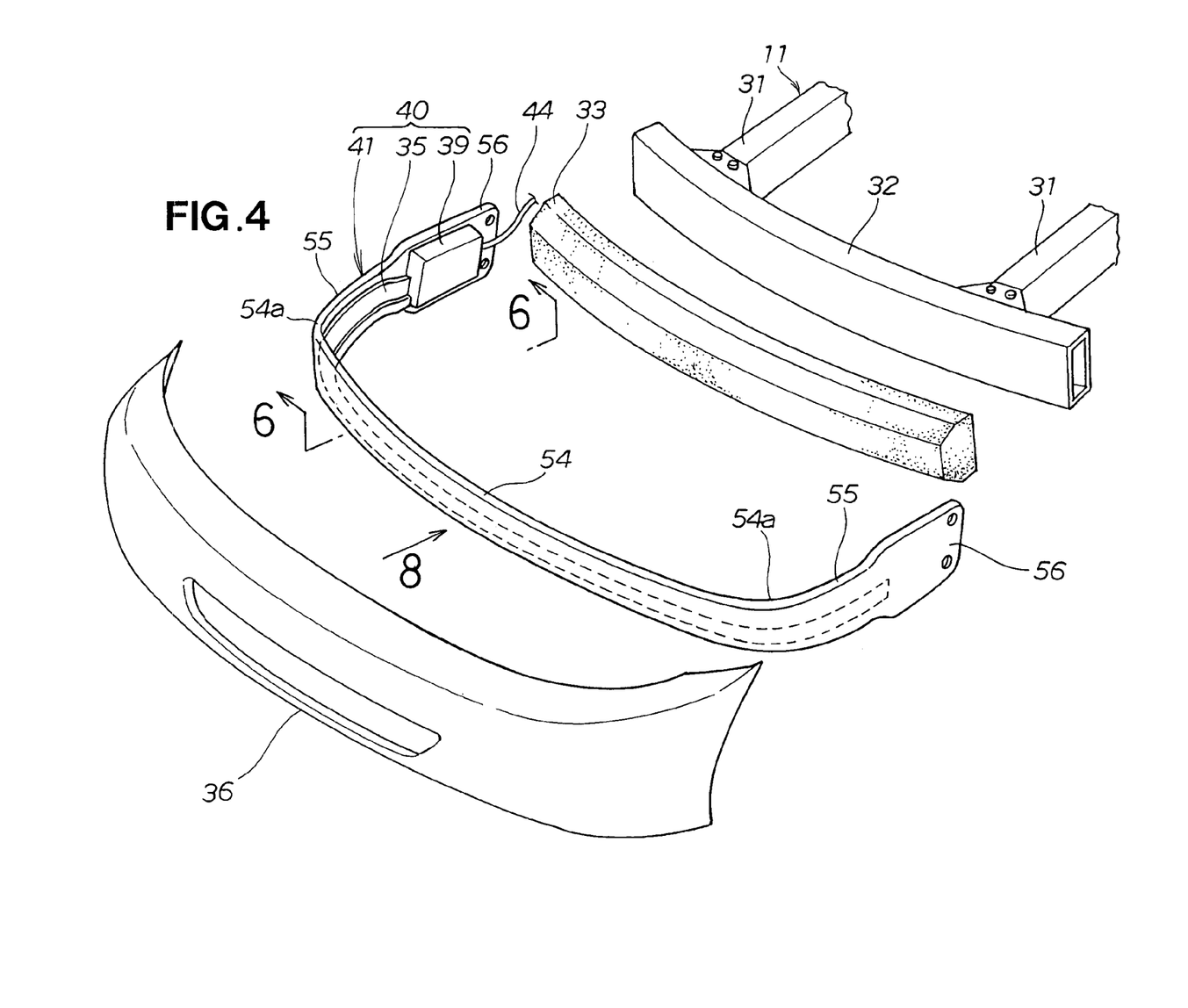
FIG. 4 is a view showing in perspective the vehicle body, the front bumper face and the sensor module which are disassembled from each other.

As shown in FIG. 3 to FIG. 5, the base plate 41 has attachment portions 56, 56 formed at ends of the right and left second sensor positioning regions 55, 55, respectively.

The vehicle body 11 has right and left attachment members (hereinafter referred to as "extension frames") 58, 58 to which the attachment portions 56, 56 of the base plate 41 are attached. The right and left extension frames 58, 58 extend transversely outwardly from the right and left front side frames 31, 31, respectively. The extension frames 58, 58 may be provided to the bumper beam 32.

The right and left attachment portions 56, 56 are attached to distal ends of the extension frames 58, 58 of the vehicle body 11 by means of bolts 57, 57. That is, the module 40 can be stably supported by the vehicle body 11 having a high rigidity.

Suppose the module 40 is supported not by the vehicle body 11 but by the bumper face of small rigidity. In this case, the module would be susceptible to vibration of the bumper face and therefore, a specific consideration would be necessary to increase durability of the module 40. In contrast with such a module 40 supported by the bumper face of small rigidity, the module 40 discussed in the illustrated embodiment of the present invention is stably supported by the vehicle body 11 of high rigidity, and it is therefore possible to assure sufficient durability of the module 40.

The base plate 41 includes a front portion disposed forwardly of the vehicle body 11, and right and left side end portions disposed rightwardly and leftwardly of the vehicle body 11, respectively. As compared to in a case where the base plate 41 does not have the right and left side end portions, the overall length of the base plate 41 in the illustrated embodiment is greater by lengths of the right and left side end portions. The sensor 35 is disposed along substantially the entire length of the base plate 41. Thus, the sensor 35 can detect an external force applied to a wide area including not only a front side of the vehicle body 11 but also right and left sides of the vehicle body 11.

The sensor 35 will be discussed with reference to FIG. 6 to FIG. 8. The sensor 35 includes a plurality of piezoelectric film sensor elements 45, a plurality of signal lines 48, a single base film 49 and a single protective film 51. As shown in FIG. 8, each of the piezoelectric film sensor elements 45 includes a single piezoelectric film 46 and a single electrode 47 attached to the film 46.

The piezoelectric film 46 is a flexible, polymeric film exhibiting piezoelectric effect. The piezoelectric film 46 generates a voltage when deformed by an external force applied thereto. On the other hand, when a voltage is applied to the piezoelectric film 46, the piezoelectric film 46 deforms. Voltage signals corresponding to amounts of deformations of the respective piezoelectric films 46 are taken from the respective electrodes 47. Such voltage signals are defined as the aforementioned sensor signals transmitted from the sensor 35 to the signal processing unit 39 by the signal lines 48.

As shown in FIG. 2, FIG. 4 and FIG. 8, the base film 49 is a flexible insulation. The base film 49 is elongated transversely of the vehicle body 11. The piezoelectric film sensor elements 45 and the plurality of signal lines 48 are provided on an arrangement surface (film surface) 49a of the base film 49. The arrangement surface 49a of the base film 49 is defined on the same side as the bumper face 36.

As shown in FIG. 8, the plural piezoelectric films 46 are aligned longitudinally of the base film 49 at equal pitches. The plural electrodes 47 and the plural signal lines 48 are formed on the arrangement surface 49a of the base film 49. For example, the electrodes 47 and the lines 48 may be printed on the surface 49a of the base film 49. The plurality of signal lines (a wiring portion) 48 individually interconnect the plural electrodes 47 and the signal processing unit 39 for transmitting the sensor signals from the sensor 35 to the signal processing unit 39.

Figure 6:
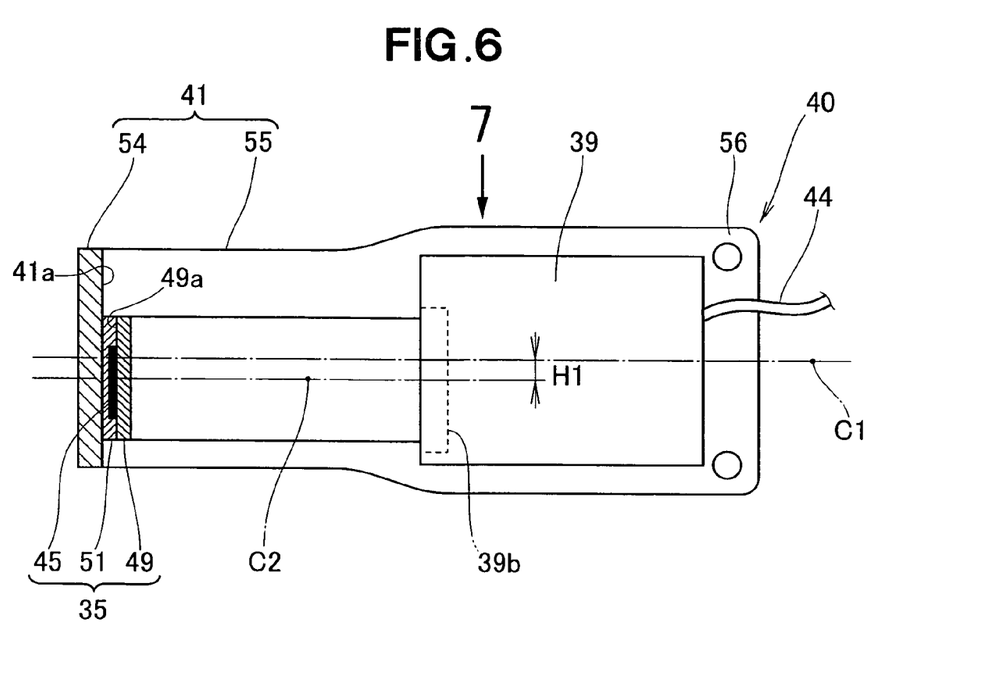
FIG. 6 is a cross-sectional view taken along line 6-6 of FIG. 4.
Figure 7:
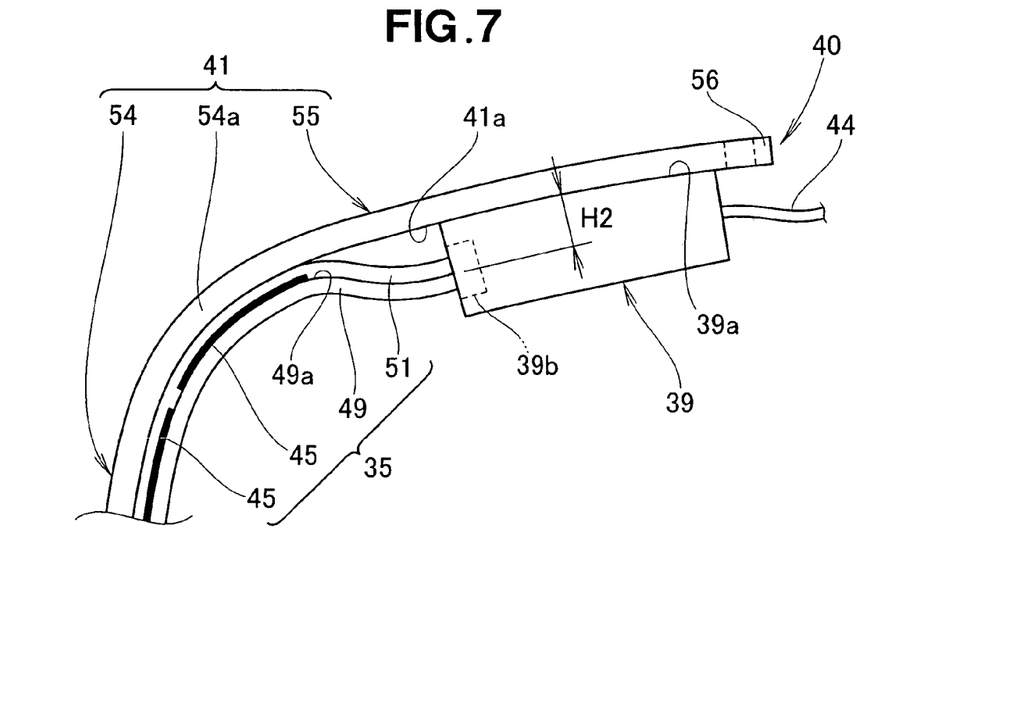
FIG. 7 is a view showing the sensor module as viewed in a direction of an arrow 7 of FIG. 6.
Figure 8:
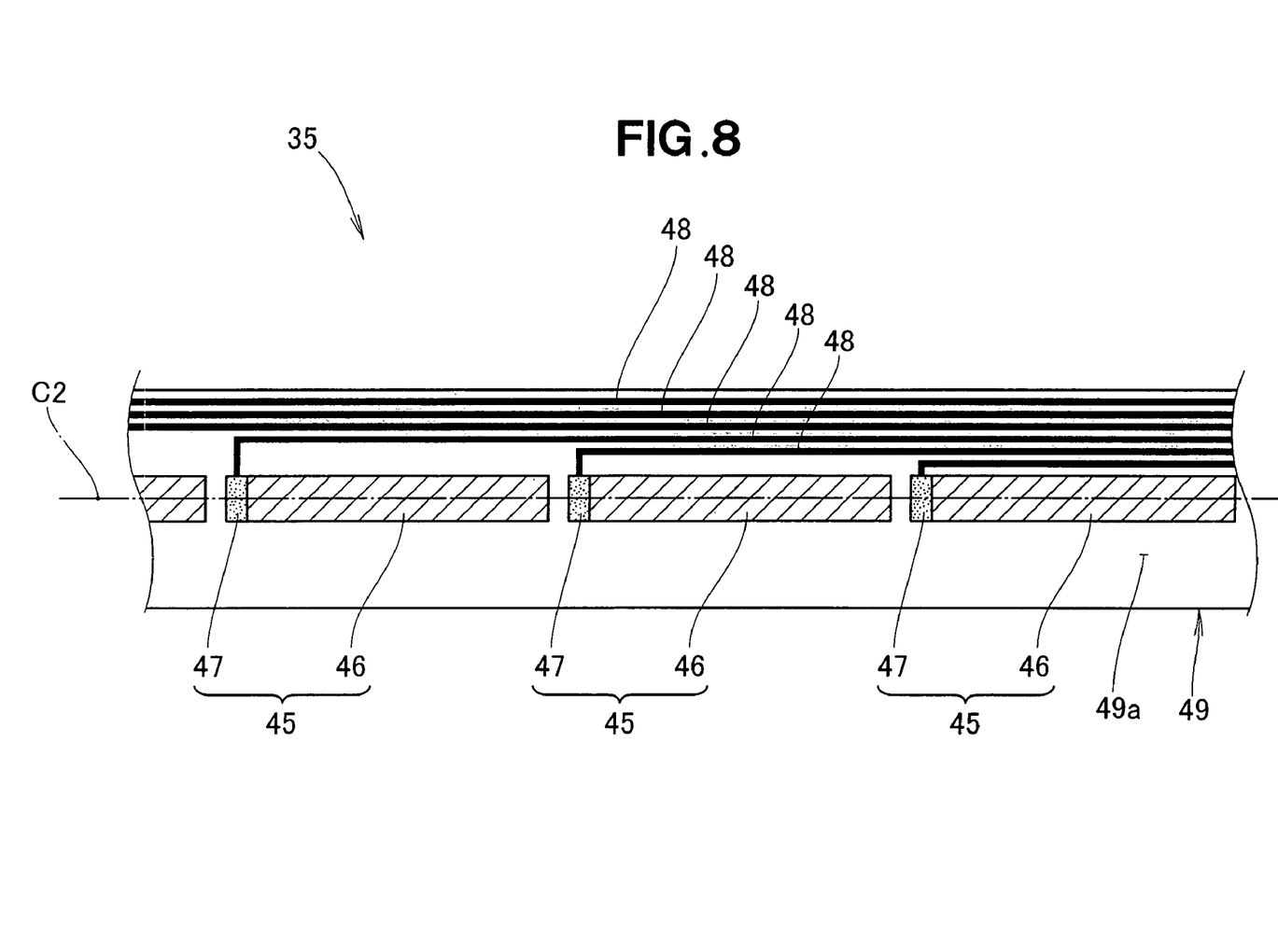
FIG. 8 is a view showing the sensor module as viewed in a direction of an arrow 8 of FIG. 4 with a protective film omitted.

As shown in FIG. 6 and FIG. 7, the protective film 51 is an electrically insulating resin film. The protective film 51 covers the arrangement surface 49a of the base film 49 for protecting the plurality of piezoelectric film sensor elements 45 and the plurality of signal lines 48 formed on the arrangement surface 49a.

As shown in FIG. 3 to FIG. 5, the module 40 has the simple arrangement in which the sensor 35 and the signal processing unit 39 are attached to the base plate 41, as discussed above. The module 40 of such a simple arrangement can be easily assembled to the vehicle body 11. Moreover, since the sensor 35 incorporates therein the signal lines 48 provided for transmitting the sensor signals to the signal processing unit 39, it becomes possible to achieve the simple arrangement in which the sensor 35 is connected directly to the signal processing unit 39 with lengths of the signal lines 48 set to minimums.

As discussed above, the sensor 35 is elongated with the plurality of the piezoelectric films 46 (FIG. 8) aligned longitudinally of the sensor 35. The base plate 41 is also elongated and greater in length than the sensor 35.

As shown in FIG. 4 to FIG. 7, the sensor 35 and the signal processing unit 39 are aligned longitudinally of the base plate 41. The sensor 35 and the signal processing unit 39 are attached directly to the attachment surface (inner surface) 41a of the base plate 41. More specifically, as shown in FIG. 5, the sensor 35 extends from the right second sensor positioning region 55 over the first sensor positioning region 54 to the left second sensor positioning region 55. The signal processing unit 39 lies in the right second sensor positioning region 55.

Since the sensor 35 extends over a wide area from the right second sensor positioning region 55 through the first sensor positioning region 54 to the left second sensor positioning region 55, the sensor 35 can detect an external force applied to either one or both of right and left sides of the bumper face 36 as well as an external force applied to a front side of the bumper face 36.

Since the sensor 35 and the signal processing unit 39 are aligned longitudinally of the base plate 41, the module 40 is elongated transversely of the vehicle body 11 and is small in width. Such an elongated module 40 can be readily disposed along such an elongated component as the bumper beam 32.

As shown in FIG. 6, the signal processing unit 39 has its center on a vertically center line C1 of the base plate 41. The sensor 35 has its center on a line C2 offset or spaced a distance H1 down from the center line C1.

As shown in FIG. 7 and FIG. 8, the sensor 35 is flexible and includes the signal lines 48 formed therein. The signal processing unit 39 has an attachment surface (bottom surface) 39a attached to the attachment surface 41a of the base plate 41, and a connection end portion 39b having plural terminals connected to the signal lines 48. The connection end portion 39b is spaced or offset a distance H2 from the attachment surface 39a.

More specifically, the sensor 35 has its end portion flexed the distance H2 away from the attachment surface 41a of the base plate 41 with end portions of the signal lines 48 spaced away from the attachment surface 41a and connected to the terminals of the connection end portion 39b of the signal processing unit 39. The flexing of the end portion of the sensor 35 makes it easy to draw and connect the signal lines 48 to the terminals of the connection end portion 39b of the signal processing unit 39.

Since the end portions of the signal lines 48 are spaced away from the attachment surface 41a of the base plate 41, the signal lines 48 of the sensor 35 and the terminals of the connection end portion 39b of the signal processing unit 39 can be maintained in stable connection with each other. This stable connection between the signal lines 48 and the terminals of the connection end portion 39b provides enhanced freedom to design the module 40.

The signal processing unit 39 may be attached to one of the right and left second sensor positioning regions 55, 55. Attached to the other second sensor positioning region 55 may be a dummy signal processing unit 39 (for example, only a case for the unit 39).

The module 40 may be disposed in a rear part of the vehicle 10. In this case, the right and left second sensor positioning regions 55, 55 extend forwardly from the opposite ends of the first sensor positioning region 54.

Obviously, various minor changes and modifications of the present invention are possible in the light of the above teaching. It is therefore to be understood that within the scope of the appended claims the invention may be practiced otherwise than as specifically described.

What is claimed is:

1. A sensor module for a vehicle, comprising:
a base plate;
a sensor attached to the base plate and including:
 a plurality of piezoelectric films for detecting an external force applied to a vehicle body of the vehicle, each piezoelectric film having an electrode attached thereto;
 a plurality of signal lines;
 a flexible base film; and
 a protective film for protecting the piezoelectric films and the signal lines formed on a surface of the base film; and
a signal processing unit attached to the base plate and connected to the sensor for processing sensor signals output from the sensor;
wherein each of the plurality of signal lines connects the electrode of each of the plurality of piezoelectric films to the the signal processing unit for transmitting to the sensor the sensor signals outputs from the sensor, and
the plurality of signal lines are aligned longitudinally with the plurality of piezoelectric films.

2. The sensor module of claim 1, wherein the sensor is elongated with the plurality of piezoelectric films aligned longitudinally of the sensor, the base plate being elongated and greater in length than the sensor, the sensor and the signal processing unit being aligned longitudinally of the base plate.

3. The sensor module of claim 1, wherein the base plate has a first sensor positioning region extending transversely of the vehicle body, and right and left second sensor positioning regions extending forwardly or rearwardly from opposite ends of the first sensor positioning region, the sensor extending from one of the right and left second sensor positioning regions over the first sensor positioning region to the other of the right and left second sensor positioning regions, the signal processing unit lying in the one of the right and left second sensor positioning regions.

4. The sensor module of claim 1, wherein the sensor is flexible and wherein said signal lines are formed therein for transmitting the sensor signals to the signal processing unit, the sensor and the signal processing unit being attached to an attachment surface of the base plate, the signal processing unit having a connection end portion connected to the signal lines, the connection end portion of the signal processing unit being offset from the attachment surface of the base plate.

5. The sensor module of claim 1, wherein the base plate has attachment portions designed to be attached to the vehicle body.

6. The sensor module of claim 5, wherein the vehicle body includes extension frames extending transversely of the vehicle body, the attachment portions being designed to be attached to the extension frames.

7. The sensor module of claim 1, wherein the electrodes and the signal lines for each of the plurality of the piezoelectric films are printed on the surface of the film base.

8. The sensor module of claim 1, wherein the sensor is flexible and further includes signal lines formed therein for transmitting the sensor signals to the signal processing unit, the sensor and the signal processing unit being attached to an attachment surface of the base plate, the signal processing unit having a connection end portion connected to the signal lines, a longitudinal center line of the sensor being offset from a center line of the signal processing unit.

9. The sensor module of claim 8, wherein the center line of the sensor is disposed below the center line of the signal processing unit.

* * * * *